E. H. LYSLE.
OPTICAL APPARATUS AND METHOD OF USING THE SAME.
APPLICATION FILED NOV. 27, 1914.

1,375,922.

Patented Apr. 26, 1921.

Witnesses:
W. J. Hartman
Alexander B. Moulton

Inventor:
Edmond H. Lysle.
By Fenton & Blount
Attys.

E. H. LYSLE.
OPTICAL APPARATUS AND METHOD OF USING THE SAME.
APPLICATION FILED NOV. 27, 1914.

1,375,922.

Patented Apr. 26, 1921.

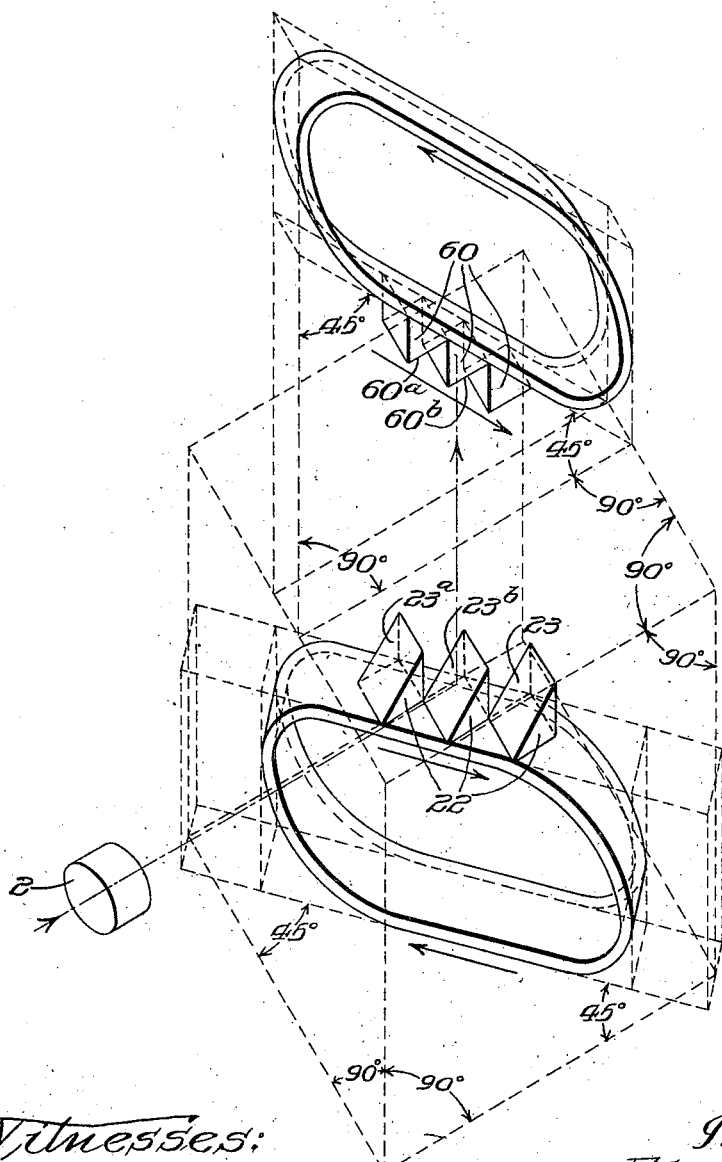

E. H. LYSLE.
OPTICAL APPARATUS AND METHOD OF USING THE SAME.
APPLICATION FILED NOV. 27, 1914.
1,375,922.
Patented Apr. 26, 1921.
7 SHEETS—SHEET 4.
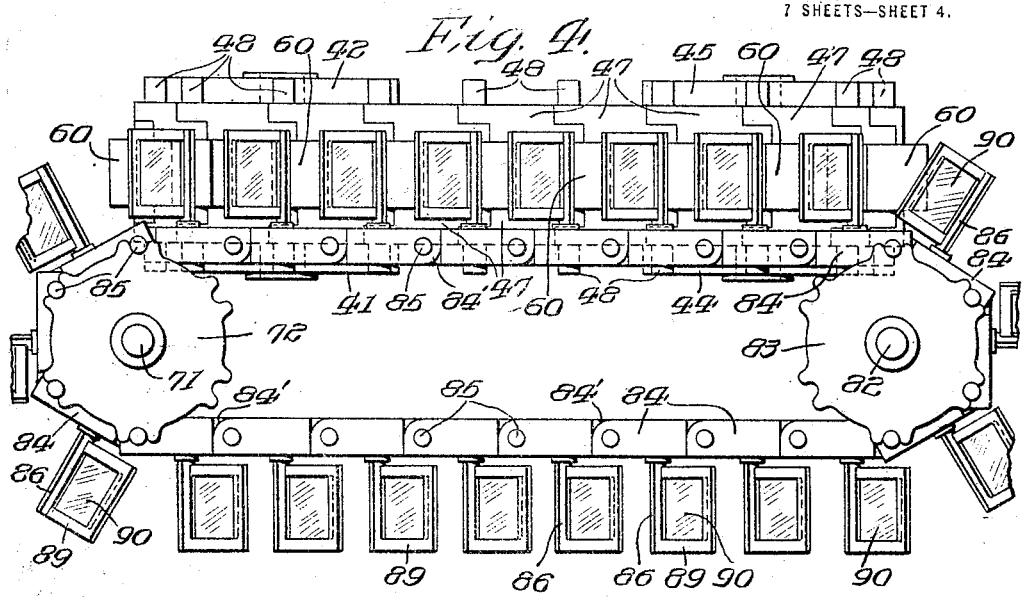
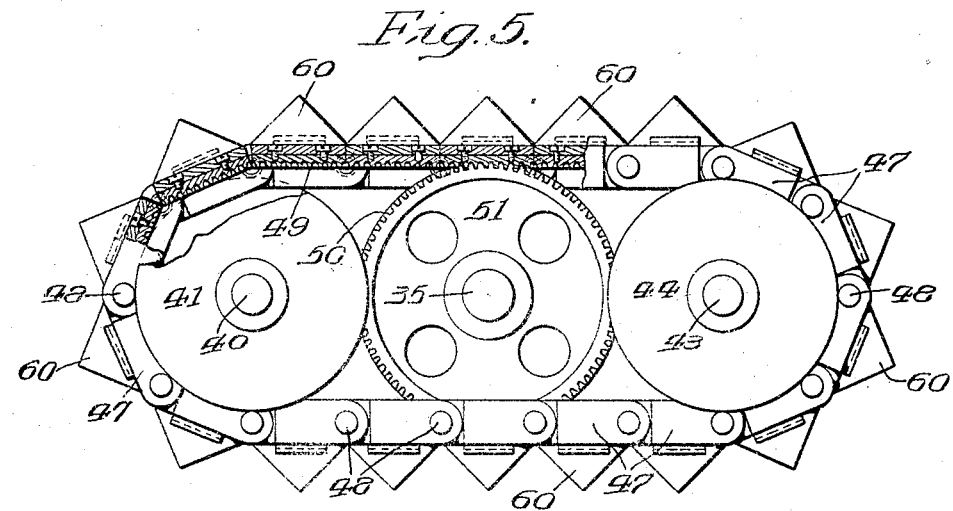
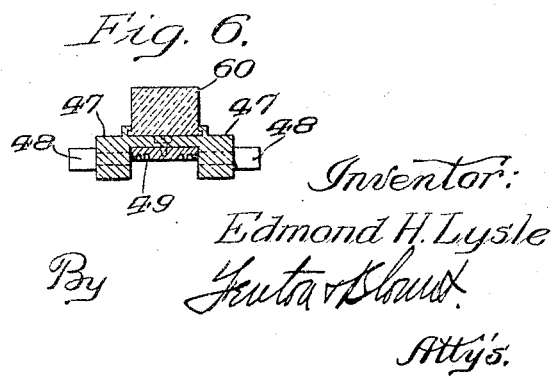
Witnesses:
F. J. Hartman.
Inventor:
Edmond H. Lysle
By
Atty's.

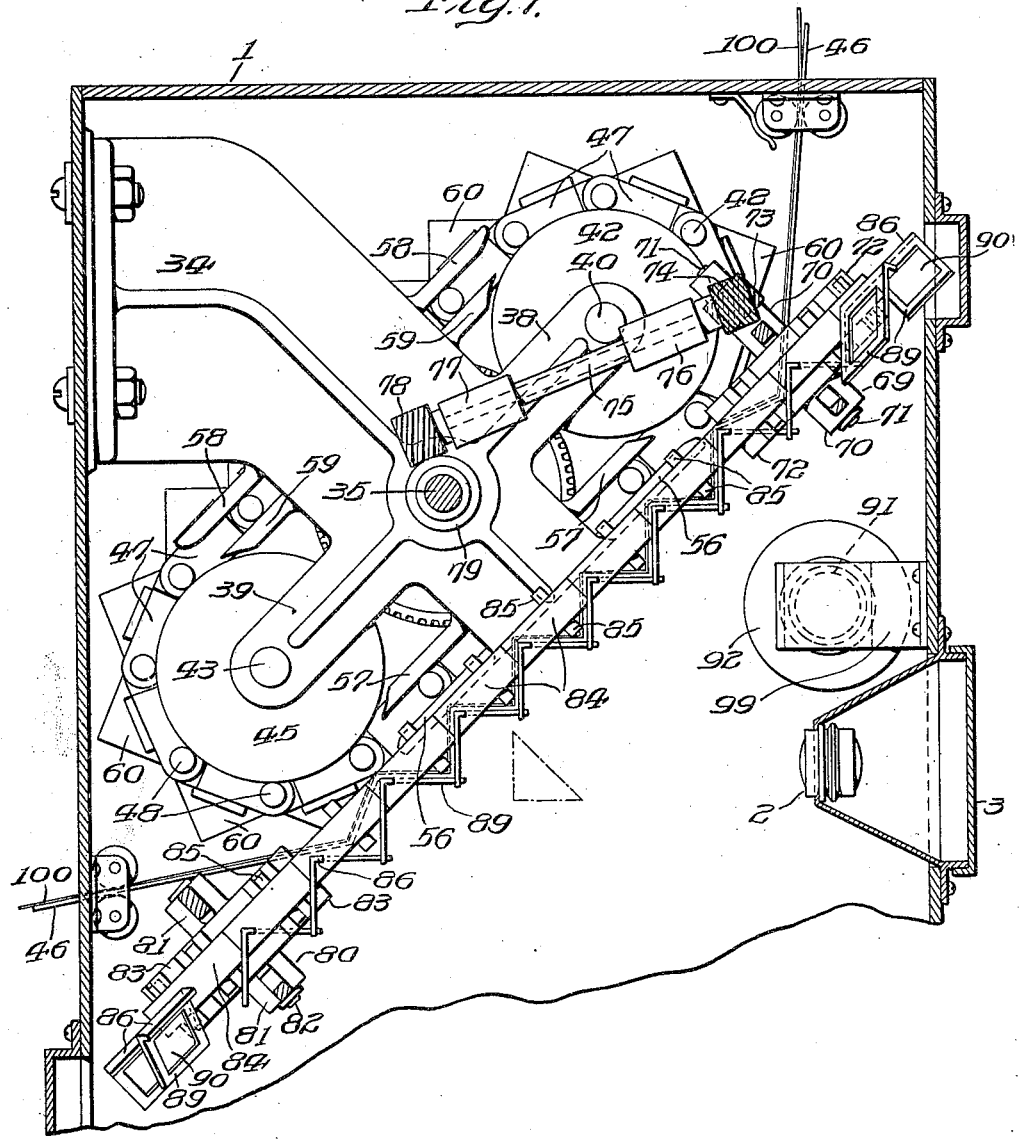

E. H. LYSLE.
OPTICAL APPARATUS AND METHOD OF USING THE SAME.
APPLICATION FILED NOV. 27, 1914.
1,375,922.
Patented Apr. 26, 1921.
7 SHEETS—SHEET 6.
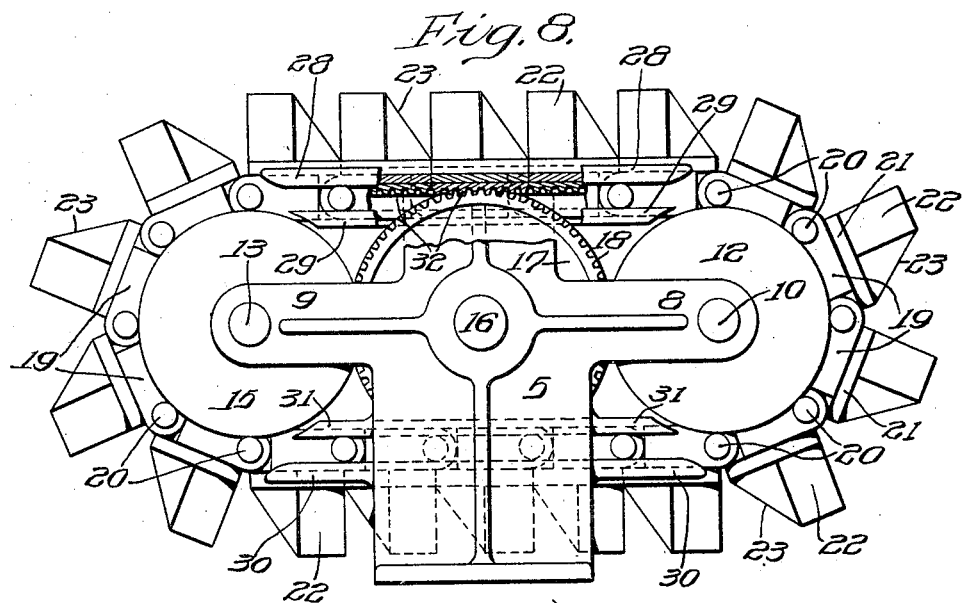
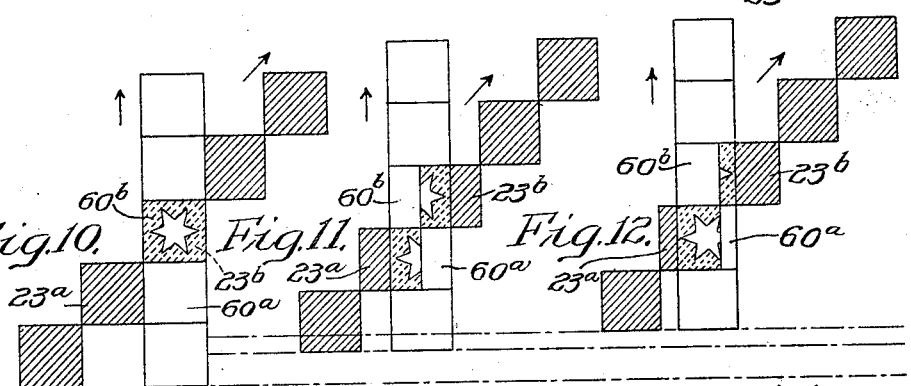

E. H. LYSLE.
OPTICAL APPARATUS AND METHOD OF USING THE SAME.
APPLICATION FILED NOV. 27, 1914.
1,375,922.
Patented Apr. 26, 1921.
7 SHEETS—SHEET 7.
Fig.14.
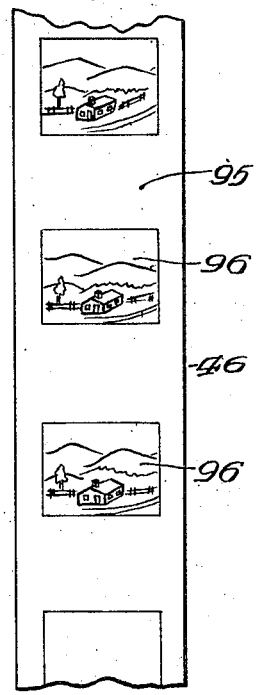
Fig.13.
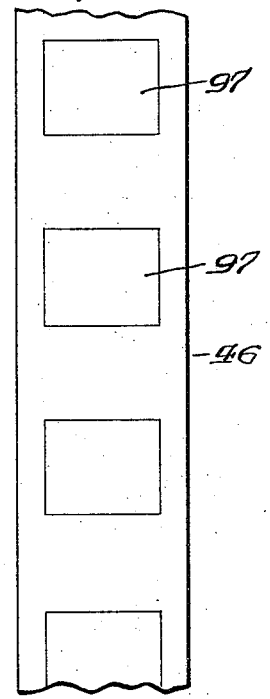
Fig.15.
Fig.16.
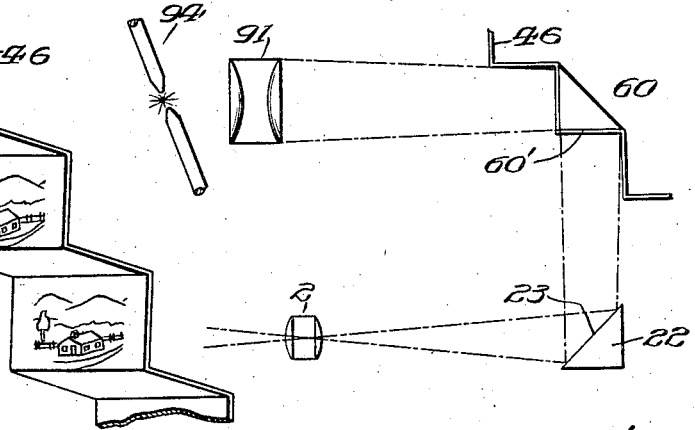
Witnesses:
F.J. Haitman.
Alston B. Moulton
Inventor:
Edmond H. Lysle.
By
Fenton & Blount.
Attys.

UNITED STATES PATENT OFFICE.

EDMOND H. LYSLE, OF NEW YORK, N. Y.

OPTICAL APPARATUS AND METHOD OF USING THE SAME.

1,375,922.     Specification of Letters Patent.     Patented Apr. 26, 1921.

Application filed November 27, 1914. Serial No. 874,152.

*To all whom it may concern:*

Be it known that I, EDMOND H. LYSLE, a citizen of the United States, and a resident of the city of New York, county of New York, in the State of New York, have invented certain new and useful Improvements in Optical Apparatus and Methods of Using the Same, of which the following is a full, complete, and exact description.

My invention relates to optical apparatus and method of using the same. The invention is peculiarly adapted for recording and projecting pictures of objects in motion, and by its use the photographic record and the projection of the same upon a suitable screen may be and is a continuous operation, as distinguished from an intermittent one, thus dispensing with and entirely eliminating the usual shutter or the use of any mechanism whatsoever, the function of which is to cause the light to pass intermittently through the lens system.

In the cameras ordinarily used for making photographic records of an animated scene or object, a suitably sensitized photographic medium is caused by various mechanical mechanisms to pass with an intermittent motion across or through the field of the lens system of the camera, and a shutter which has been properly synchronized to operate in connection with the film actuating mechanism is adapted to intermittently expose substantially adjacent portions of the film to the action of the light permitted to enter the camera through the lens system. The film is given an intermittently progressive motion, and a portion of the film is exposed during the period that the film is at rest. When the shutter is closed, to prevent the entrance of light into the camera, the film is rapidly shifted or progressed to bring the next successive portion of its sensitized surface into position for exposure and then held stationary during the period that the shutter is opened.

In apparatus ordinarily used in projecting motion pictures, the same theory or principle of operation and the same or similar or equivalent mechanism or mechanisms are employed to cause an intermittent travel or progression of the image surface, and to cause a beam of light to pass intermittently through the image strip or position print and out of the projector, said light being allowed to pass through the lens to the screen at intervals when the image strip or negative is stationary. Various applications of this same idea have been heretofore developed, but the basic principle, the underlying optical theories, and the mechanical constructions embodied therein are substantially identical.

It is obvious that when either a camera or projector of the above described ordinary type is employed, all of those phases of the motion or changes in position of the object in motion occurring during the intervals when the shutter of the camera is closed, must be lost to the record on the film, and to the projected scene on the screen, and although the proportion of the recorded to the unrecorded action or motion of the object photographed may be considerably varied by adopting different gearing relations between the shutter and the film actuating mechanism, the shifting of the film and the incidental closing and opening of the shutter necessarily require an appreciable definite length of time, during which the photographic functions of the camera or the projecting functions of the projector must necessarily be suspended. It is therefore readily apparent that no absolutely complete photographic record of an animated scene or object or more than a partial record of the motion of the same can be made by means of any such system or apparatus as has been above indicated.

The phenomenon which is ordinarily described as a moving picture is in reality merely an optical illusion achieved through what may be described either as a function or a lack of precision in the operation of the optic nerve and retina of the eye, and which is known as "persistence of vision." The theory of motion pictures heretofore produced is based merely on the premises that if a vivid image be impressed upon the retina of the eye it will not fade therefrom for an appreciable space or interval of time, and that if a successive series of separate and distinct pictures substantially registering with each other but each representing a different or a more advanced stage in the motion of a given scene or object, be presented in such a rapid succession that the eye is unable to distinguish any period or time of change between the separate pictures, the illusion of motion will be produced.

In the systems heretofore employed there are, however, certain inherent difficulties and shortcomings, a serious one of which is the strain to which the eye of the observer is subjected. When a picture has been brought to a stationary position between the source of light and the projecting lens, and the mechanism has caused the shutter of the projecting machine to open, a very brilliant and vivid image is thrown upon the screen and thence presented to the retina of the eye. The shutter, however, closes almost immediately after opening, and a period follows in which there is no image or picture whatever upon the screen. The retina of the eye, however, does not act so quickly, and the image upon the retina, which at the moment of the opening of the shutter was at its maximum or brilliancy, commences to fade away from the very moment when the shutter is closed in bringing the next successive picture on the film into position for projection upon the screen. Now, in this intermittent system of projecting motion pictures the frequency of projection is so timed or calculated that the shutter or projector will reopen and throw the succeeding picture upon the screen before the image of the preceding picture shall have faded from the retina of the eye of the observer. There must be, therefore, an appreciable interval of time required to shift the film and to close and reopen the shutter, and since there is no actual image upon the screen during this period of change, there is produced upon the retina of the eye a decided variation between the brilliancy of the image when it is first conveyed to the eye and when it has almost faded, just previous to the presentation thereto of the succeeding picture. It is readily apparent then that, so far as the optical mechanism of the eye is concerned, the illusion of a motion picture consists in a rapid succession of brilliant flashes and a gradual fading away thereof, the brilliant flashes being intermittently presented during the continuance of the process of projection.

This intermittent quality of the light is the principal cause of eye strain incidental to the observance of a motion picture. The optic nerve and various other nerves and muscles of the eye comprise virtually an extremely delicate and sensitive mechanism, and although by increasing the frequency of the presentation of the separate pictures, and by increasing the length of time that the shutter is open with respect to the time that it is closed, the injurious effects on the eye may be somewhat reduced, they must necessarily at all times exist to a considerable extent.

It must also be apparent that the impartation to the photographic film through a projector of the rapid intermittent motion above indicated tends to rapidly destroy or injure the film, which is necessarily of relatively delicate texture, and as the film wears, the progression thereof through the projector is liable to vary from what it originally was, due, for instance, to the enlarging of the holes or perforations in the edges of the strip or film, by means of which the motion of the driving gears is imparted to the film, and this would tend to destroy the perfect registration of the successive images upon the screen, thus causing either a blurring of or lack of distinctness in the resulting picture on the screen, or possibly a lateral or vertical movement of the picture as a whole upon the screen.

The invention of this application may be said to differ and be distinguished from the apparatus heretofore in use and above described in at least two distinct particulars, namely, (1) the film or sensitized surface of a camera, or image surface of a projector is given a continuous motion, as distinguished from an intermittent motion as above described, through the camera or through the projector, and (2) all ordinary forms of shutters are eliminated so that there is no interval of time during which the camera or projector when in use is not recording or projecting.

In the system forming the subject matter of this application, the lens is stationary during the operation of the mechanism, and is continuously open, and the film or negative or image strip is given a regular continuous steady longitudinal motion within the camera or projector during the operation of the same.

The device of this application is a combined camera and projector. The essential features of construction operate in the same manner whether the device is operating as a camera or as a projector. The principal lens system may be the same in the camera as in the projector. When used as a camera, a sensitized photographic film is caused to pass into the field of light entering the camera through the lens system. When used as a projector, a strong light is projected through a positive print and out through the lens system to a screen or similar surface. When used as a camera, the film is a sensitized film; when used as a projector, the film is a positive print of the negative produced by the device when operating as a camera. The film, in either case is a long, narrow, preferably flexible strip of celluloid, or similar material.

One object of this invention is to provide an improved optical device for continuously making a continuous photographic record of an object in motion.

Another object of this invention is to provide an improved optical device, adapted to be utilized as a camera, for making a negative photographic record through a fixed lens system upon a photographic recording medium when it is in constant motion at the point, and during the interval, of exposure.

Another object of this invention is to provide an improved optical device adapted to be utilized as a projector for projecting an image from a continuously moving projective medium such as, for instance, an image strip, or series of positive prints through a stationary lens system to a fixed point upon a proper screen.

Another object of this invention is to provide an improved optical device adapted to be utilized as a means by which a continuously moving properly sensitized photographic medium can be exposed to the action of the rays of light projected by a stationary lens system for a predeterminable shorter interval than is actually required to pass the exposed portion of the film across the image circle of the lens.

Another object of this invention is to provide an improved optical device for maintaining an optically precise and stationary relationship between a given object, the optical center of a fixed lens system and a constantly moving photographic medium.

A further object of this invention is to provide an improved optical device adapted to be utilized as a camera for producing upon a continuously moving photographic medium a consecutive succession of correlated negative photographic records of the successive phases of an object in motion.

A further object of this invention is to provide an improved optical device adapted to be utilized as a camera for continuously exposing a properly sensitized photographic medium to the action of rays of light projected by a fixed lens system in such a manner as to produce upon the said medium a series of consecutively successive impressions such as will constitute a complete negative photographic record of the motion of any given object.

A further object of this invention is to provide an improved optical device adapted to be utilized for projecting upon a proper screen a positive print made from the above mentioned negative photographic record, in such a manner as to present to the eye a single fixed and continuous pictorial reproduction of any given scene or object without the loss of any of the motion or graphic characteristics of the original and substantially independent of that peculiar optical faculty, which is commonly referred to as a persistence of vision.

A further object of this invention is to provide an improved optical device adapted to be utilized as a camera for obtaining through a fixed lens system upon a continuously moving and properly sensitized medium a negative photographic record of the full and precise color values of any given scene or object either stationary or in motion.

A further object of this invention is to provide an improved optical device adapted to be utilized for projecting upon a proper screen a positive print made from a negative photographic record mentioned in the foregoing paragraph in such a manner as to present to the eye a single fixed continuous pictorial reproduction of any given scene or object without the loss of any of its visual characteristics either as to line, color or motion.

Other objects of this invention will appear in the specification and claims below.

In the embodiment of my invention as illustrated in the drawings forming a part of the present application, and as applied to a camera, I employ two sets of carriers, one for a series of reflectors and one for the sensitized surface upon which the photographic record is formed, and the first carrier for convenience will be referred to as the reflector carrier, and the second as the film carrier.

The co-acting portions of the two carriers lie or are arranged in planes making right angles with each other. The coöperating portions of the two carriers are arranged to move in their respective planes in lines which make an angle of 45° with the plane of the other carrier. For convenience, the operative portions of the two carriers will be referred to as being arranged, one in the horizontal and the other in the vertical plane. When the plane of the operative portion of the reflecting carrier is in a horizontal plane, the co-acting operative portion of the film carrier will lie in a vertical plane, but the direction of the movement of said portion of the reflecting carrier in the horizontal plane will be at an angle of 45° to the vertical plane which has been assumed to be the plane of the co-acting portion of the film carrier, and conversely, when the plane of the operative portion of the film carrier is a vertical plane, the direction of the movement of the film carrier in that plane is at an angle of 45° to the horizontal plane which has been assumed to be the plane of the reflector carrier.

Looking at the disposition of the co-acting portions of these carriers with respect to each other from another point of view, and defining their positions with respect to the principal axis of the lens system, the plane of the operative portion of the reflector carrier will be coincident with or parallel to the principal axis of the lens; the direction of the travel of the reflector carrier in that plane will be at an angle of 45° to the principal axis of the lens and the motion will be, generally speaking, in a direction away from the lens; the direction of the travel of the reflector carrier in that plane will be at an angle of 45° to the principal axis of the lens, and the motion will be, generally speaking, in a direction away from the lens. At the same time the plane of the co-acting operative portion of the film carrier will be coincident with the principal axis of the lens system; it will be normal to the plane of the reflector carrier and the direction of the travel of the film carrier in said plane will be at an angle of 45° to the principal axis of the lens and generally in a direction away from said lens. The disposition of the two carriers with respect to each other, and their direction of travel are clearly shown in Figure 3.

Considering the apparatus to be set up and positioned in the manner indicated in Figs. 1, 2 and 3, with the operative portion of the reflector carrier lying in a horizontal plane, the direction of the movement of the reflector carrier in that plane will be at an angle of 45° to the principal axis of the lens, transverse thereto, and generally speaking, away from the lens system, while the operative co-acting portions of the film carrier will move in a vertical plane coincident with the principal axis of the lens, and the direction of the travel of the film carrier will be at an angle of 45° to the principal axis of the lens, and generally speaking in a direction away from the lens.

Referring now to the drawings forming a part of the specification and in which the same reference characters are employed to designate the same parts throughout the various views, Fig. 1 is a side elevational view, with the casing in section, of one embodiment of my invention;

Fig. 3 is a diagrammatic view illustrating in isometric projection, the relation of the operative parts of the mechanism, shown in Figs. 1 and 2, to each other and to the lens system;

Fig. 4 is a fragmentary detailed view of the mechanism for holding the film on the operative portions of the film carrier, and Fig. 5 is a side elevational view, partly in longitudinal cross-section of the film carrier;

Fig. 6 is a cross sectional view of one of the prisms forming the film supporting surface and the carrier therefor;

Fig. 7 is a side elevational view of the film carrier and the mechanism coöperating therewith, a portion of the casing shown being in cross-section and the view of the mechanism being taken from the opposite side to that shown in Fig. 1;

Fig. 8 is a side elevational view of the reflector carrier, the series of reflectors mounted thereon and the mechanism for operating the same, same view being taken from the side of the machine opposite to that shown in Fig. 1;

Fig. 9 is a diagram to show how the distance between the optical center of the lens system and the operative surfaces of the film is maintained constant;

Figs. 10, 11 and 12 are diagrammatic views showing how the surfaces of the reflectors and the co-acting surfaces of the film or film carriers move with respect to each other;

Fig. 13 is a fragmentary plan view of a sensitized film adapted to be used with a camera constructed to operate in the apparatus shown in Figs 1 and 2;

Figure 1:
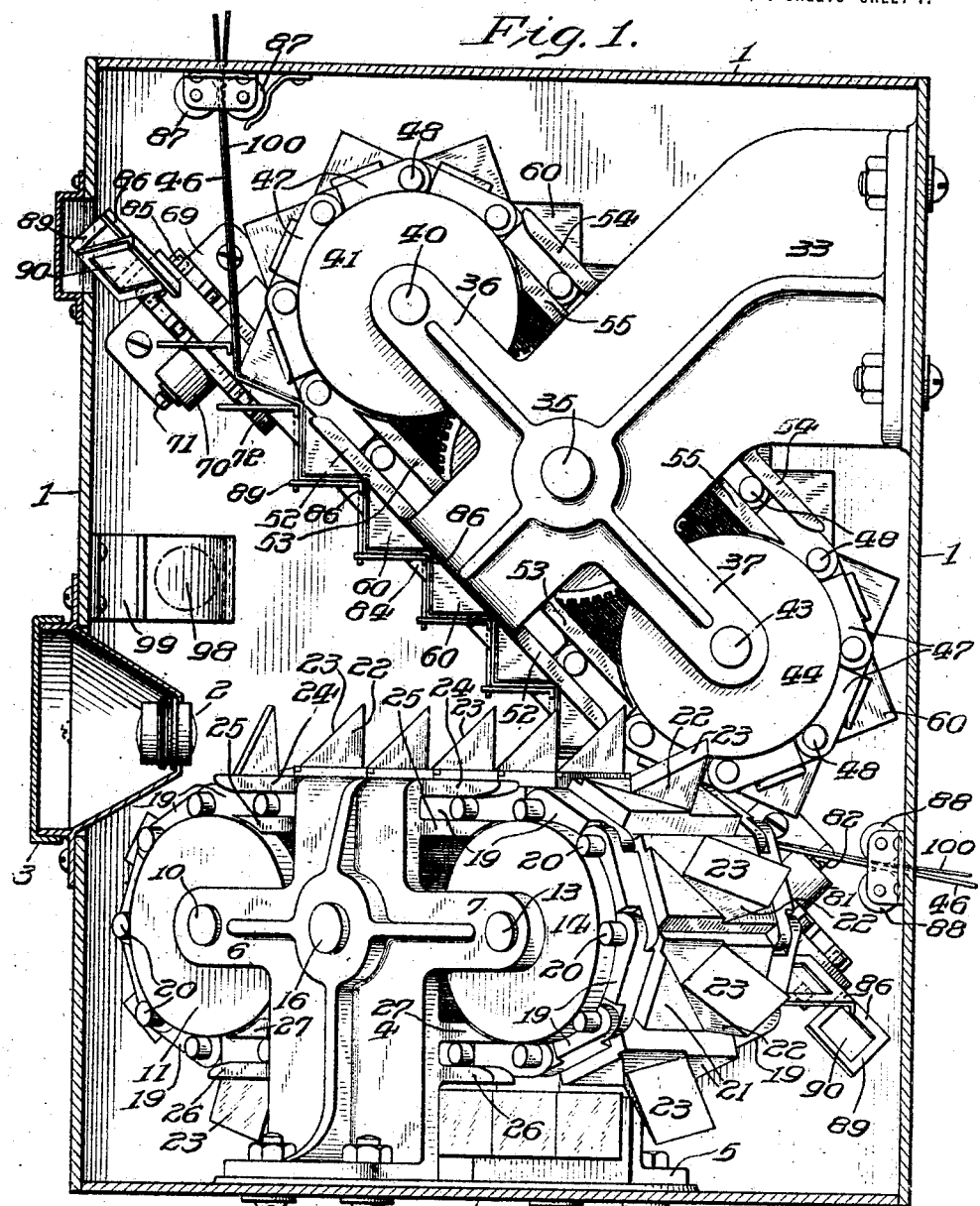
Figure 2:
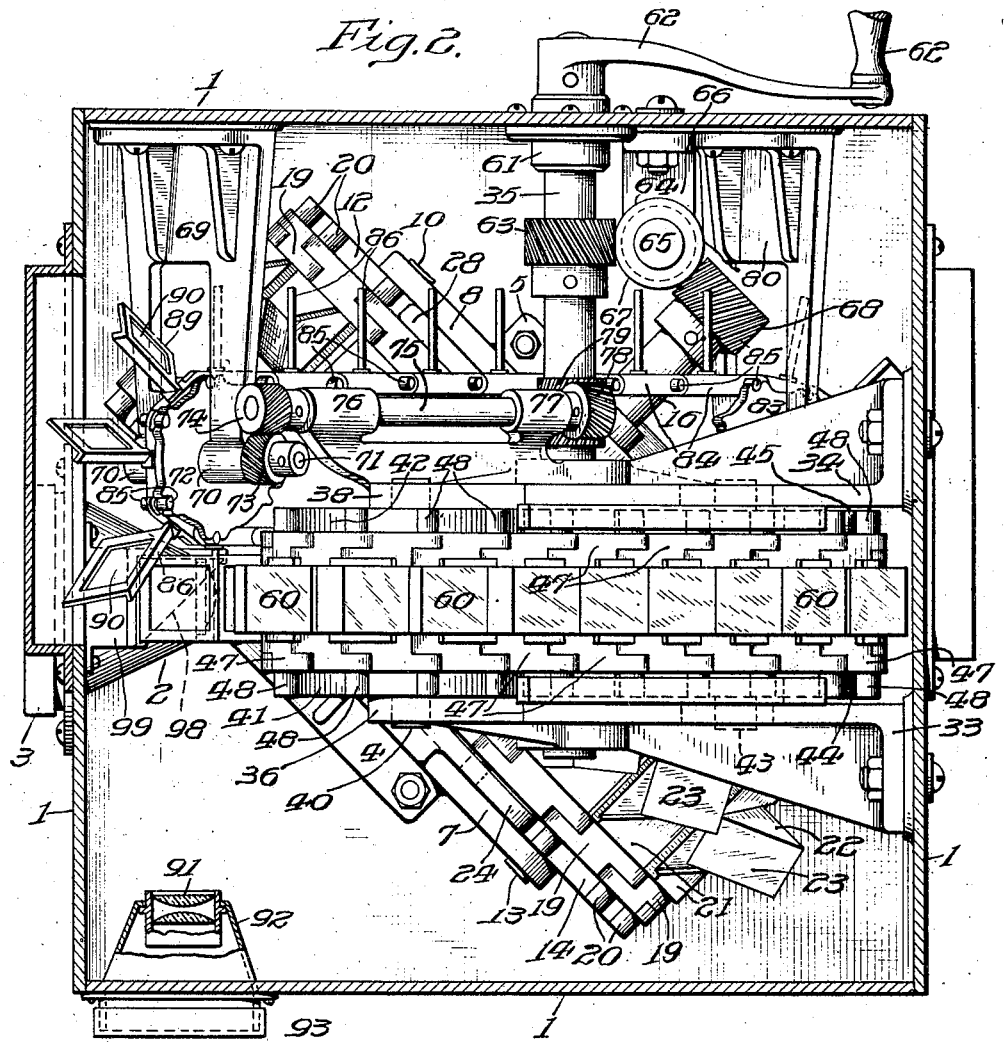
Fig. 2 is a plan view of the section shown in Fig. 1, the casing being shown in horizontal cross section.

Fig. 14 indicates a portion of a positive film strip formed from a negative produced from an exposed film having a structure as shown in Fig. 13;

Fig. 15 is a perspective view of a section or portion of the film showing the manner in which the images are arranged with respect to each other when passing through the device when operated as a projector; and Fig. 16 is a diagrammatic view showing one manner in which a photographic record produced by a camera constructed in accordance with the showing in Figs. 1 and 2 may be used in a projector for projecting said pictures upon a screen to produce a motion picture.

For the purpose of describing my invention, I will first describe the device as operating as a camera for making a photographic record of an object in motion, and will thereafter describe the operation of the device when operating as a projector.

Referring then particularly to Figs. 1, 2 and 3, there is provided a light-proof casing 1, within which is inclosed the operating mechanism and upon the front side thereof is mounted a fixed lens system 2 of any approved type, which lens system is stationarily mounted with respect to the casing 1. It is not necessary to provide shutters for intermittently opening and closing the lens during the operation thereof, but the front of the lens system may be provided with a cap 3 for closing the lens when the apparatus is not in use.

Upon the bottom of the casing 1 are rigidly mounted two brackets 4 and 5, which extend upwardly. The bracket 4 has two laterally projecting arms 6 and 7, and the bracket 5 has two similarly disposed laterally projecting arms 8 and 9. (See Fig. 8.)

Journaled in the arms 6 and 8 of the brackets 4 and 5 respectively is a shaft 10, upon which is mounted a pair of idler pulleys 11 and 12, each near the opposite ends of the shaft 10 respectively and adjacent the arms 6 and 8 respectively.

Similarly journaled in the arms 7 and 9 is a shaft 13 also carrying two idler pulleys 14—15, mounted between the arms 7 and 9 of the brackets 4—5 similarly to the manner in which the idler pulleys 11 and 12 are mounted.

Also mounted in the brackets 4—5, and substantially midway between the shafts 10 and 13 is a driving shaft 16, upon which is rigidly mounted a gear wheel 17 having teeth 18, preferably of the spiral gear type. The shaft 16 is preferably in the same horizontal plane as the shafts 10 and 13.

Arranged over and around the idler pulleys 11, 12, 14 and 15 respectively is a carrier for the series of reflectors used in the device. Said carrier consists preferably of a series of links 19, the adjacent ends of which are pivotally connected together by pivot pins 20 so that the said links and pivot pins form substantially an endless chain extending around the said idler pulleys. The width of the links 19 is preferably substantially equal to the distance between the adjacent faces of the idler pulleys 11 and 12 respectively, and the idler pulleys 14 and 15 respectively, and the pivot pins 20 preferably extending laterally beyond the sides of the links 19, so that the said endless chain is supported upon the said idler pulleys 11, 12, 14 and 15 by the engagement of the pins with the periphery of said idler pulleys, as is plainly indicated in Fig. 1. Each link is provided with a block or support 21 upon each of which is mounted in any particular manner a reflector 22. These reflectors may be of any approved type, but they are shown in the drawings as being metal prisms each having a highly polished reflecting surface 23.

The bracket 4 is provided at its top with laterally projecting parallel arms 24—25, and below and parallel thereto with two other laterally projecting arms 26—27, each pair forming between them guideways between which the ends of the pivot pins 20 pass and by which the series is guided in their travel between the idler pulleys 11—14, and the bracket 5 is similarly provided with similarly disposed arms 28, 29, 30 and 31, between which the opposite ends of the pivot pins 20 similarly travel between the idler pulleys 12 and 15.

The inner face of each block or support 21 of the links 19 is preferably provided with teeth 32 meshing with the teeth 18 on the opposite sides of the gear wheel 17. From this it is plain that when motion is imparted to the shaft 16, the gear wheel 17 is rotated and, by virtue of the engagement of its teeth 18 with the teeth 32 on the inner sides of the link 19, the chain formed of the links 19 will be driven in an endless path around the idler pulleys 11, 12, 14 and 15, said endless chain being held in engagement with the teeth of said gear 19 by the engagement of the ends of the pivot 20 with the guiding surfaces formed between the arms 24, 25, 26, 27, 28, 29, 30 and 31 and that the links will travel in a right line between the idler pulleys by reason of the engagement of the ends of the pivot pins 20 with the guideways above described.

For convenience in describing the relative position of the various parts of the mechanism with respect to each other, and with respect to the lens system, the apparatus may be presumed to be set up in the manner indicated in Fig. 1, that is to say, with the bottom of the casing 1 horizontal, the axes of the shafts 10, 13 and 16 in a horizontal plane, and the principal axis of the lens system 2 extending in a horizontal plane. It is to be understood, however, that the apparatus may be operated successfully, with the apparatus set in some plane other than the horizontal. An understanding of the relation of the parts, however, will be most readily arrived at if it be assumed that the above described planes are horizontal.

The reflector mechanism above described is so disposed with respect to the principal axis of the lens that the center of each reflecting surface in its horizontal operative travel between the idler pulleys is in a horizontal plane coincident with the principal axis of the lens system 2. The direction in which the reflectors travel in said horizontal plane, however, is at an angle of 45° to the principal axis of the lens system. To obtain this relation the axis of the shafts 10, 13 and 16 are arranged in a horizontal plane and extend at an angle of 45° to a vertical plane passing through the principal axis of lens system. The relation of the reflector system to the lens is clearly illustrated diagrammatically in Fig. 3.

Mounted within the casing 1 is also a film carrying system or mechanism which will be next described.

Within the casing 1 are mounted two brackets 33 and 34 within which is journaled a shaft 35. The brackets 33 and 34 are preferably secured to the rear wall of the casing 1 and their free ends extend downwardly as is clearly indicated in Figs. 1 and 7. The bracket 33 is provided with two laterally extending arms 36 and 37, while the bracket 34 is provided with two similarly arranged and disposed arms 38 and 39. Within the free ends of the arms 36 and 38 is mounted a shaft 40, upon which are rigidly mounted two idler pulleys 41 and 42, and in the arms 37 and 39 is journaled a shaft 43, upon which is also rigidly mounted idler pulleys 44 and 45.

The idler pulleys 41 and 42 are spaced apart from each other and each lies adjacent its respective arm 36—38, and the idlers 44—45 are similarly mounted and arranged with respect to each other. Upon these idlers 41, 42, 44 and 45 is mounted the carrier for the photographic medium. In a camera this medium is preferably a sensitized strip or film, while in a projector, the photographic medium 46 would be a positive print from the negative obtained from the developed film. The carrier for the film or photographic medium comprises a series of links or blocks 47, having their ends pivotally connected together by pivot pins 48 thus forming substantially an endless chain structure. The width of each link 47 is preferably substantially equal to the distance between the inner adjacent sides of the idlers 42 and 43 respectively, and the idlers 44 and 45 respectively, and the pivot pins 48 extend outwardly beyond the sides of the links or blocks 47 to engage the peripheries of the idlers 41, 42, 44 and 45, as the chain in its travel passes around the same. The inner sides of the links 47 are provided with a rack 49 having teeth which are adapted to mesh with the teeth 50 of the gear wheel 51 rigidly mounted on the shaft 35. Preferably the teeth of the said gear 51 and the rack 49 are of the spiral gear type, as illustrated in the drawings.

The bracket 33 is preferably provided with two pairs of laterally extending arms 52, 53, 54 and 55 forming between them guideways within which one end of each of the pivot pins 48 pass on one side of the chain in their travel between the idler pulleys 41 and 44, while the bracket 34 is similarly provided with four laterally extending arms 56, 57, 58 and 59, which respective pairs of arms form between them similar guideways for the other ends of the pivot pins 48 in their travel between the idler pulleys 42—45. The guideways so formed also serve to hold the teeth of the racks 49 on the links or blocks 47 in driving engagement with the teeth 50 of the gear wheel 51. Each link or block 47 carries upon its outer surface a block 60 preferably in the shape of one-half of a cube, said cube being cut diagonally to form a prism and the face of the prism so formed having the greatest area is mounted to be in engagement with the link.

The axes of the shafts 35, 40 and 43 are preferably arranged at an angle of 45° to the principal axis of the lens system and the direction of the travel of the chain and the prisms 60 carried thereby in their lower course between the idlers 41—42 and 44—45 respectively, is in a vertical plane also passing through the principal axis of the lens system.

It will be seen that the reflecting surface 23 of each reflector is arranged to intercept the principal reflecting axis of the lens system at an angle of 45° as the said surface passes through the same while the active surfaces of each prism of the film carrier is disposed one in a horizontal plane parallel to the principal axis of the lens system and the other in a vertical plane normal to the principal axis of the lens system.

The carriers for the reflector system and the carriers for the film or photographic medium are driven at the same linear speed and therefore the coöperating surfaces thereof move synchronously with respect to each other.

Preferably the shaft 35, which is journaled in the brackets 33 and 34 as above described, is the main driving shaft of the mechanism for imparting motion to the carriers. The shaft 35 is therefore extended through a bearing 61 in the casing 1, and its outer end is provided with a suitable crank or handle 62 or other suitable device for driving the same. Upon the shaft 35 is rigidly mounted a spiral toothed gear 63 which meshes with and drives a spiral toothed gear 64, in turn rigidly mounted upon a vertical shaft 65, which is journaled in suitable bearings in the bracket 66, rigidly secured to the interior of the casing 1. The vertical shaft 65 carries below the gear wheel 64 a second spiral toothed gear 67, which meshes with and drives a spiral toothed gear 68, rigidly secured to the shaft 16, which shaft, as before described, is journaled in the brackets 4 and 5 and forms the driving shaft for the carrier for the reflectors. Thus, when the crank 62 is turned the upper course of the series of reflectors 23 will be caused to travel in a horizontal plane, and transverse to the principal axis of the lens system, said series of reflectors crossing the principal axis at an angle of 45°, and moving, generally speaking in a direction away from the lens system.

Simultaneously, the lower course of the carrier system for the film or photographic medium will be given a motion in a vertical plane passing through the principal axis of the lens, the line of travel of said course of the film carriers will be at an angle of 45° to the principal axis of lens system, the general motion of the lower course of the film carriers will be in a direction away from the lens system.

The series of prisms 60 of the film carrier virtually form a series of steps on the under operative side of the film carrier, the lower surface of said steps being in a horizontal plane and the side of said steps facing the lens system in a vertical plane. The film or photographic medium 46 is held smoothly against the stepped surface of the film carrier by a mechanism which will be next described.

Mounted upon the interior of the casing 1 is a bracket 69, carrying at its outer free end suitable bearings 70—70, within which is journaled a shaft 71. Said shaft is provided between said bearings 70—70 with a suitable pair of sprocket wheels 72—72, and upon one end of said shaft 71 is mounted a spiral toothed gear 73.

Said gear 73 is arranged to mesh with a spiral toothed gear 74, rigidly secured to a shaft 75 mounted to turn in bearings 76—77 provided on the side of the bracket 34, and the opposite end of the shaft 75 is provided preferably with a spiral toothed gear 78 arranged to mesh with a spiral toothed gear 79 on the main driving shaft 35.

Also secured to the inside of the casing 1 is a bracket 80 similar to the bracket 69, and provided at its outer free end with bearings 81—81, within which is journaled a shaft 82, said shaft being provided with a pair of spaced idler wheels 83—83.

Said sprocket wheels 72—72 and spaced idler sprocket wheels 83—83 are arranged to support and carry a sprocket chain, which is composed of a plurality of links 84 pivotally connected together by pivot pins 85, the width of the links 84 being substantially equal to the distance between the adjacent faces of the idler sprocket wheels 83—83. Said sprocket wheels 72—72 are arranged to coöperate with opposite sides respectively of the pivot pins 85 of the sprocket chain which project laterally beyond the sides of the links 84, and are arranged to fit into the sprocket teeth of the sprocket wheels 72—72 as the sprocket chains pass therearound, and similarly the idler sprocket wheels 83—83 are arranged to engage the opposite ends respectively of the pivot pins 85 as the chain passes between and around said sprocket wheels.

One course of said sprocket chain is arranged adjacent and parallel to the under course of the film carrier and closely adjacent one side thereof. The links 84 of said sprocket chain are substantially equal in length to the links 47 of the film carrier and the gearing 79, 78, 74 and 73 is so proportioned as to impart to the sprocket chain passing around the sprocket wheels 72—72 and 83—83 the same linear speed as that which the film carrier receives.

Moreover, each link 84 of said sprocket chain is provided with an outwardly projecting post or bar 86 so positioned on said links 84 as to lie closely in the angle between the vertical face of the adjacent prism 60, substantially throughout the lower course of the travel of the film carrier.

Each link 84 is provided on one end with a rounded corner 84', the outer surface of which is cylindrical about the axis of its respective pivot, the result being that the sprocket chain is free to flex in one direction, but is prevented from flexing in the opposite direction by reason of the fact that the unrounded corners of the adjacent links abut, thus insuring the maintenance of the sprocket chain in a substantially right line between the sprocket wheels 83—83 upon which the chain is mounted.

From the above it will be plain that the film or photographic medium 46 passes into the casing 1 between the guide rollers 87—87. It passes over the apex of a prism 60 of the film carrier and almost immediately the opposite side of said film 46 is engaged by the post or bar 86 closely following the first prism on the under course of the film carrier and as the motion of the film carrier and of the sprocket chain continue, the post 86 draws the film 46 tightly against the outer surface of the prisms 60 and holds the said film 46 against the stepped surface of the film carrier throughout the downward course of the film carrier with one section of the film horizontal and the immediately adjacent section of the film vertical. The converse of this operation is performed by the film carrier and posts 86 at the end of the downward course of travel; that is to say, as the prisms 60 deflect from their straight course between the idler pulleys 41 and 44 to move in a curved path around the same they move away from the posts or bars 86 and permit the film or photographic medium to straighten out as the same is delivered from between the stepped surface of the carrier and the posts so that the film is substantially delivered as a straight strip of film. The film is thus drawn away from the carrier by the drawing rollers 88, and thence out of the casing 1 to a suitable reel (not shown).

If the photographic medium 46 be a sensitized photographic film, it is of course obvious that the film is delivered to the feed rollers 87 from a dark receptacle, presumably attached to or connected with the casing 1, and the exposed sensitized film 46 will be similarly delivered by the drawing rollers 88 to another darkened chamber or suitable receptacle, in which the exposed film might be contained until it could be developed. If the photographic medium or film 46 be a positive print, it is obvious that the film might be delivered to the feed rollers 87 directly from a suitable reel and delivered from the drawing rollers 88 to a second suitable reel upon which the same would be rewound.

The apparatus above described is particularly adapted for use in producing color photography, that is to say, the pictures of objects in motion may be recorded in natural colors upon the sensitized film or the film so produced or made may be projected upon the screen by the above mechanism to produce a motion picture in natural colors. To accomplish this preferably provide each of the links 84 with a frame 89 for containing a color screen 90, and make the post or bar 86 constitute one side of said frame 89. The frames 89 are each so set with respect to the links 84 as to lie closely adjacent the horizontal plane of its respective prism during the downward operative course of the film on the film carrier, thus placing a suitable color screen 90 directly over the horizontal surface of the sensitized film 46 as it enters the field of the lens, when the device is used as a camera, and to cover the corresponding print when the device is used as a projector. These frames 89 are so arranged as to consecutively present the color screens 90 in proper sequence, as for instance, screens or filters having color values corresponding to red, blue, and green, and of course the same sequence should be maintained in projecting upon a screen the positive prints made from negatives formed by the use of said color screens.

Inasmuch as the film carrier and the series of reflectors both travel, generally speaking, in a direction away from the lens during the operation of the device and make the same angle 45° to the principal axis of the lens system although their lines of travel are in planes normal to each other and coincident with the principal axis of the lens, it is apparent that the resultant motion of each reflector and the coöperating portion of the film in a direction parallel to the principal axis of the lens, and since the resultant of these motions in either of these planes (for example in the vertical plane), is along the side and the hypotenuse of a right-angled isosceles triangle, as clearly indicated in Fig. 9, the distance from the optical center O of the lens system to any point in the exposed surfaces $46^a$ and $46^b$ of the film, will be constant and the focus may be maintained, notwithstanding the fact that a film and the reflector are constantly in motion, and that exposed portions of the film may be in different parallel planes.

Another result of this construction is that the field of illumination of the lens as projected to or upon the film or film carrier, remains stationary with respect to that portion of the film or photographic medium throughout the time during which any portion of said film is within the field of said lens. In other words, a fixed and correct optical relationship is constantly maintained between the virtual image projected by the lens system and the film when the device is being used as a camera and between the positive and the picture on the screen when the device is used as a projector.

From the foregoing description of the apparatus of this application, particularly when used as a camera, it will be apparent that the action of the reflectors and the coöperating portions of the film as supported upon the film carrier in separate parallel planes produce substantially a focal plane camera effect in the exposure which is made on the film. The virtual image is stationarily positioned with respect to the film notwithstanding the fact that the film is constantly moving, and the exposure is the relatively gradual progressive exposure of a focal plane shutter camera. A portion of the virtual image first appears along one side edge of the surface of the film and unfolds or extends until it substantially fills the surface. The virtual image first disappears from the first exposed portion of the film in the same way, that is, it begins to disappear from the side edge of the film which was first exposed and the virtual image is progressively cut off as the reflecting surface passes out of the field of illumination of said lens.

This action enables me to vary the time of the actual exposure of the film. By reducing the area of the reflecting surface any selected point in the exposed portion of the film will be exposed to the action of light for only that length of time required for the reflecting surface to pass through the field of illumination. If, therefore, the reflecting surface be made narrower, the time of exposure is proportionately reduced. The reflecting surface may be made narrower in any desired manner, as for instance, by blackening a portion or portions of the reflecting surface, or by actually making the reflecting surface narrow as compared with the area of illumination of the lens system. In this manner, the sharp definition obtained in the ordinary focal plane shutter camera is readily obtained, and in fact from this point of view, this apparatus, when used as a camera, may be properly termed a camera for photographically recording objects in motion, embodying a focal plane exposure of the film.

In Figs. 10 to 12 inclusive, is illustrated in a diagrammatic manner, the way in which the coöperating surfaces of the reflectors and of the active surfaces of the prisms co-act during the operation of the device, the unshaded squares indicating the active surfaces of the prisms and the shaded squares indicating the active reflecting surfaces, two active coöperating surfaces of the prisms are designated as $60^a$ and $60^b$ and two active coöperating reflecting surfaces are designated $23^a$ and $23^b$. In Fig. 10 the active portion $60^b$ of one prism is in coextensive registration with a reflector $23^b$. This relation occurs, however, but for a moment during the operation of the device, for from the next moment of their travel until the succeeding surfaces $60^a$ and $23^a$ reach the same relation with each other there will always be two adjacent reflectors coacting with two adjacent active portions of the prisms. In Fig. 11 the prism surfaces 60ª and 60ᵇ and reflector surfaces 23ª and 23ᵇ are shown as having advanced until only half of a reflector 23ᵇ is in vertical alinement with half an active surface 60ª of the prism with which it coöperates, and the following co-acting surfaces 23ª and 60ª are shown as having half the surface of one coacting with one-half the surface of the other. In Fig. 12, the surfaces have continued their movement until only one quarter of the first mentioned reflector is in active relationship with one quarter of its coöperating film carrier surface while the following reflector has three fourths of its surface co-acting with three fourths of the surfaces of its co-acting portion of the film or film carrier. The virtual image, represented by a star, will remain stationary, with respect to the surface.

In order to use the device as a projector, I provide the casing 1 with a lens 91 mounted in a suitable casing 92, provided with a cap 93 for closing the lens 91, when the same is not in use. The prisms 60 are made of glass. Referring to Fig. 16, the said lens 91 is diagrammatically indicated as is the glass prism 60 and the film or image strip 46. This film or image strip, however, is a positive print obtained from a negative made from the exposed film. One reflecting prism 22 is also indicated as is the fixed lens system 2. A suitable illuminating device, such as an arc or calcium light 94 is arranged to throw its light into the casing through the lens 91. The film carrier and the series of reflectors are then moved as they were when the device was used as a camera as above set forth, with the result that the prism 60 acts as a reflector for the light entering its vertical face from the lens 91 and reflects it to the coöperating reflector 22 and thence out through the fixed lens 2. This is possible by reason of the fact that in the developed film there is a clear space between adjacent negatives due to the fact that the vertical surfaces of the film on its carrier during the operation of the device as a camera do not receive any light through the fixed lens system. Therefore, when the film is developed there are clear spaces co-extensive with the vertical face of the film carrier between adjacent negatives. This clear portion 95 of the film 46 is clearly illustrated in Fig. 14, while the negatives are indicated by the numeral 96. In Fig. 13, the film 46 is a sensitized film having surfaces 97 provided with a sensitive emulsion.

With the device set up and arranged as shown in Figs. 1 and 2, I prefer to mount the lens 91 in one side of the casing and to provide a reflector 98 mounted on a suitable support 99 and secured to the inside of the casing in alinement therewith so that the light permitted to enter the casing through the lens 91 will strike first against the reflector 98 and be deflected thence through the vertical surface of the glass prism 60 which may be in alinement therewith. In Fig. 15 is shown the image strip as a positive print from a negative the same being shown in the position in which it is bent during its operative engagement with the film carrier.

The apparatus forming the subject matter of this application may then be used either as a camera or as a projector. When used as a camera, the opening of the condenser lens 91 is closed in any suitable manner, as by the cap. When used as a projector, the cap over the condenser lens 91 is removed and light is reflected or conducted to the interior of the casing as above described.

When the device is arranged to operate as a camera only, it is not necessary that the prisms 60 be made of glass; in fact, it is preferable that they should be made of some opaque substance. When, however, they are constructed of glass so as to permit of the device being used as a projector as above described, a film or strip 100 of opaque black paper or similar material should be fed in with the sensitized film 46 so as to come between the film and the carrier to prevent the light from passing through the film and through the glass prism and fogging the film. In Fig. 1 and Fig. 7, the prism 60 was assumed to be of glass and the opaque paper strip 100 is shown as interposed between the sensitized film and the film supporting surface of the film carrier, that is to say, between the sensitized film and the glass prisms 60.

It should be noted that when the device is used as a projector of pictures in natural colors, the field of illumination remains stationary with respect to the screen, except in so far as the object or image may move, while the record thereof was being taken or made, but the substantially primary and complementary colors of the visible spectrum sweep across the illuminated portion of the screen in waves, one following the other, and, except for an instant when the illuminated portion is all of one color, there will be two colors moving across the screen continually in succession. In other words, starting with the position in which the picture is of a color corresponding to red, and moving the apparatus slowly as the record and reflectors move the next color, that correspond to the blue will appear along one edge of the picture and will appear to move toward the opposite side of the picture while the area corresponding to the red decreases until it has appeared to have passed off the screen, at which time the color corresponding to blue will cover the entire picture. Immediately thereafter, however, the color corresponding to blue will appear to move across the screen, as did that corresponding to the red, while the color corresponding to the green, appearing at the side of the picture, replaces the color corresponding to blue as fast as it moves toward the opposite side, until the entire picture is of a color corresponding to green. The color corresponding to red, however, similarly follows that corresponding to green and both appear to move in the same direction, the former increasing in area and the latter decreasing until the picture is again all of a color corresponding to red.

These waves of color, however, do not have any injurious effects whatever upon the eye of the observer nor is the resulting effect due to what has heretofore been referred to as "persistence of vision." There are two colors on the screen substantially all the time, and while one set of nerves in the eye may respond more fully to one color (i. e. the red) than to another color (e. g. the blue), nevertheless the nerves responding to red respond in a somewhat less degree to blue, and somewhat, though to a less extent to green. A similar relation exists between the nerves responding to blue green and red, respectively and to green, red and blue respectively.

Hence it is that the rapid succession of these colors in natural sequence on the screen in waves keeps all the nerves of the eye each in some state of vibration when the light is pemitted to pass through the film in projection and the action of the waves is the relatively natural gradual action which is performed by the eye in analyzing any color transmitted to the eye naturally, and the eye of the observer of pictures of objects in motion in natural colors produced in accordance with the invention of this application is not strained or injured.

By providing the device, when used as a camera, with screens or light filters of the three colors corresponding to the primary and complemental colors of the visible spectrum and arranging them in their normal sequence, (e. g. the colors corresponding to red, blue and green) all of the color values of the objects being photographed will be accurately recorded on the sensitized surfaces, and when prints, from the negatives so formed, are projected by the said apparatus to a screen through light filters corresponding to the same primary colors, in the same order, the resulting picture on the screen will show the object or objects in exact natural colors.

In other words, by the practice of the invention of this application the reproduction upon a screen, of objects in all their natural colors is readily effected by first obtaining a negative photographic record containing all of the true and natural chromatic characteristics of a given object by screening the potential picture spaces on the sensitized medium with consecutive sets of complemental color-value filters during the process of exposure, and following this by projecting light through a relatively transparent medium composed of a series of prints from said negative photographic record each print being projected through a proper color screen or filter corresponding to that employed during the exposure in the camera of the corresponding surface of the sensitized film, the filters employed in the recording and projecting being those which correspond to the main primary and complemental colors of the visible spectrum arranged in sequence and in their natural order.

While in the above apparatus, all ordinary forms of shutters have been eliminated and the light is permitted to pass into or out of the lens system continuously, the series of reflecting surfaces act to successively expose (in the camera) and to bring into action (in the projector) the successively adjacent sections of the film or the photographic medium and to this extent the reflecting media operate as light shutters.

In projecting pictures of an object in natural colors as above described, in the above described apparatus the series of prints on the transparent medium of the projector, operate to cut off or diminish the amount of light permitted to pass through parts or portions of the medium, the light, passing through a series of three consecutive or complemental prints, being variable, and different in similar parts of the different complemental prints depending upon the actinic value of the light which was allowed to pass to the sensitized surface through the particular color screen or filter employed in taking the original negative of that print, and to that extent the film, or series of prints, from a given negative, acts as a color value shutter.

Thus, in the invention of this application there is, from one point of view, a co-active operation of a color value shutter with a reflector or series of reflectors acting as light shutters, and these features constitute an important part of the invention.

Of course, it is to be understood that if desired, the apparatus of this application may be used to record pictures of objects in motion in the ordinary black and white form; that is to say, by either removing the color screens from the frames without otherwise modifying or changing the construction or operation of the mechanism and the prints made from the negatives so formed may be similarly projected without the interposition of color screens.

That any point in a film during exposure or any image strip during projection and within the field of illumination of the lens is always at a fixed distance from the optical center of the lens notwithstanding the fact that the film or image strip moves with respect to the lens will be clearly apparent by reference to Fig. 9. Inasmuch as the reflectors 22 and the block 60 upon which the film or strip is supported, move at the same linear speed and each at an angle of 45° to the principal axis of the lens system, the distance $wx$ between the optical center of the lens system and the surface $60^a$ will always equal $wy z$, the distance between the optical center of the lens and the surface $60^b$. It therefore follows that if one portion or part of the film or image strip be in focus with the lens all the other parts of the image strip or film, whether they be located in the same or different planes, will be in focus, and the distance between the optical center of the lens and any portion of the film or image strip within the field of illumination of the lens will be constant.

It is, of course, obvious that slight changes both in construction and in the operation of the device may be made without departing from the spirit and scope of this invention so long as such changes or modifications fall within the scope of the appended claims.

Having thus described my invention, what I claim and desire to protect by Letters Patent of the United States is:

1. In an optical apparatus, the combination with a fixed lens system, a series of reflectors, and a continuous film, of means to move said series of reflectors continuously across the principal axis of said lens system and at an angle of 45 degrees thereto, and means to move said film continuously in the same general direction as that in and at the same linear speed as that at which said series of reflectors is moved but in a line intersecting the principal axis of the lens at an angle and in a plane normal to the plane coincident with the principal axis of the lens and the line of travel of said reflectors.

2. In an optical apparatus, the combination with a fixed lens system, a series of reflectors, and a continuous film, of means to move said series of reflectors continuously across the principal axis of said lens system at an angle of 45° thereto, and means to move said film continuously in the same general direction as that in which said series of reflectors is moved but in a line intersecting the principal axis of the lens at an angle of 45° and in a plane normal to the plane coincident with the principal axis of the lens and the line of travel of said reflectors.

3. In an optical apparatus, the combination with a fixed lens system, a film and a series of reflectors, of means to move said reflectors consecutively through the principal axis of said lens system at an angle thereto, said reflectors each having a reflecting surface disposed at an angle to the principal axis of said lens system during the time when it is passing through said axis to reflect the light in a direction normal to the plane coincident with the principal axis of said lens system and the line of movement of said reflectors, means to move said film at the same linear speed as that of said reflectors in a line intersecting the principal axis of said lens system at an angle thereto, said line of movement of said film and the principal axis of said lens system lying in a plane normal to that in which lies the line of movement of said reflectors and the principal axis of said lens system, and means to hold consecutive portions of said film in planes parallel to the plane coincident with the principal axis of said lens system and the line of travel of said reflectors with the center of each of said portions in alinement with the axis of said lens system as reflected by said reflectors, throughout the period during which each of said portions of said film is in the field of said lens.

4. In an optical apparatus, the combination with a fixed lens system, a film and a series of reflectors, of means to move said reflectors consecutively through the principal axis of said lens system at an angle of 45° thereto, said reflectors each having a reflecting surface disposed at an angle of 45° to the principal axis of said lens system during the time when it is passing through said axis to reflect the light in a direction normal to the plane coincident with the principal axis of said lens system and the line of movement of said reflectors, means to move said film at the same linear speed as that of said reflectors in a line intersecting the principal axis of said lens system at an angle of 45° thereto, said line of movement of said film and the principal axis of said lens system lying in a plane normal to that in which lies the line of movement of said reflectors and the principal axis of said lens system, and means to hold consecutive portions of said film in planes parallel to the plane coincident with the principal axis of said lens system and the line of travel of said reflectors with the center of each of said portions in alinement with the axis of said lens system as reflected by said reflectors, throughout the period during which each of said portions of said film is in the field of said lens.

5. In an optical apparatus, the combination with a fixed lens system, a film and a series of reflectors, of means to move said reflectors consecutively through the principal axis of said lens system, said reflectors each having a plane reflecting surface disposed at an angle to the principal axis of said lens system during the time when it is passing through said axis to reflect the light against a portion of said film, and means to move said film in a line intersecting the principal axis of said lens and in a plane normal to that in which lies the line of movement of said reflectors and the principal axis of said lens, and to hold consecutive portions of said film in planes parallel to the plane coincident with the principal axis of said lens system and the line of travel of said reflectors throughout the period during which each portion of said film is in the field of said lens as reflected from said reflectors.

6. In a moving picture apparatus, the combination with a fixed lens and a photographic medium, of means to hold successive portions of a photographic medium in planes parallel with respect to each other, means to move said medium continuously while held in planes parallel with respect to each other, means to reflect different portions of the field of illumination of said lens into planes of focus parallel to each other and to maintain said planes of focus coincident with said planes of said medium.

7. In a motion picture apparatus, a fixed lens system, a reflector, means to continuously move said reflector across the field of said lens at an angle of 45° to the principal axis of said lens system and in a direction generally away from said lens, a photographic medium, means to move said medium at the same linear speed as that of said reflector and in a line disposed at an angle of 45° to the principal axis of said lens, axis of said lens system being at the intersection of two planes disposed at right angles to each other, one plane being coincident with the line of travel of the center of said reflector and the other plane being coincident with the line of travel of the center of said medium.

8. In a motion picture apparatus the combination of a fixed lens system, a photographic medium, means to impart to said medium a continuous motion, a series of reflectors, means to impart a steady uninterrupted motion to said reflectors, said motion being of the same linear speed as that of said medium, to bring adjacent portions of said film continuously into the reflected field of said lens and to hold said field stationary with respect to and in focus with that portion of said film which may be in said field.

9. In a motion picture apparatus the combination with a fixed lens system, of a film carrier, means to continuously move said carrier, a series of reflectors, and means to continuously move said series of reflectors at the same linear speed as said carrier to maintain a fixed focal distance between said lens and any portion of said carrier which may be in the field of said lens at any time and throughout the time during which it is in said field.

10. In a motion picture apparatus the combination of a fixed lens system, a film carrier, means to continuously move said carrier, a series of reflectors, means to continuously move said reflectors at the same linear speed as said carrier to maintain a fixed focal distance between said lens system and any portion of said carrier which may be in the field of said lens and throughout the period during which it is in said field, and to maintain said field stationary with respect to that portion of said film which may be in said field and throughout the period during which it is in said field.

11. In a motion picture apparatus, the combination of a single fixed lens system, a photographic film, means to impart a constant steady motion of travel to said film, in a path angularly disposed to the principal axis of said lens system, a set of reflecting mediums disposed between said film and said lens, means to move said reflecting mediums at the same linear speed as said film to maintain a correct optical relationship at all times between any given point on said film and the optical center of said lens system while it is in the field of said lens system.

12. In a motion picture apparatus, a fixed lens system, a reflector, means to continuously move said reflector through the field of illumination of said lens system to reflect the light at an angle to the principal axis of said lens system, a photographic medium, means to cause said medium to lie in a plane normal to the axis of the lens as reflected by said reflector, and means to move said photographic medium at the same linear speed as said reflector is moved and at an angle to said reflected axis of said lens system to hold said field stationary with respect to said medium and to maintain said medium in the plane of focus of said lens system.

13. In a motion picture apparatus, a fixed lens system, a series of reflectors, a carrier for a photographic medium, means to form a photographic medium into a series of separate parallel planes, means to move said reflectors continuously in a direction across the principal axis of said lens, and means to continuously move said carrier to bring said parallel planes through the axis of said lens as reflected by said reflectors and to maintain the distance constant between any exposed portions of said planes and the optical center of said lens system.

14. In a motion picture apparatus, means to form a photographic medium into a series of parallel planes, means to successively and continuously bring said planes into the focus of said lens and move the same continuously through the area of illumination of said lens system, all the planes within said area of illumination being in the focus of said lens system.

15. In an optical apparatus, a fixed lens system, means to cause reflected portions of the virtual image projected by said lens system into different parallel planes and to constantly move said planes, a carrier for the photographic medium provided with a series of parallel plane surfaces, and means to successively bring said plane surfaces of said carrier successively into, and through the moving planes of said virtual image.

16. In an optical apparatus, a fixed lens system, a carrier for a photographic medium, said carrier having operative surfaces arranged in a series of parallel planes, and means to move said surfaces across the field of illumination of said lens and to maintain said surfaces at a fixed focal distance from said lens throughout the period during which said surfaces are in said field.

17. In an optical apparatus, a fixed lens system, a carrier for a photographic medium, said carrier having operative surfaces arranged in a series of parallel planes, and means to move said surfaces across the field of illumination of said lens and to maintain said surfaces at a fixed focal distance from said lens throughout the period during which said surfaces are in said field and to maintain said field stationary with respect to said surfaces.

18. In an optical apparatus, a film carrier having a stepped series of operative surfaces arranged in parallel planes, and means to cause a continuous photographic medium to conform to said surfaces, a fixed lens system, and means for continuously moving said carrier through the field of said lens.

19. In an optical apparatus, a fixed lens system, means to bring a photographic medium into separate parallel planes, means to continuously move said record so shaped into and through the plane of the focus of said lens.

20. In a motion picture apparatus, a fixed lens system, means to bring a photographic medium into a substantially consecutive series of separate parallel planes, means to continuously move said record so shaped into and through the plane of the focus of said lens.

21. In a motion picture apparatus, a fixed lens system, means to bring a photographic medium into a series of parallel planes, and means to continuously move said medium so shaped through the planes of the focus of said lens and to hold said planes of focus stationary with respect to said planes of said photographic medium when and while any of said planes are in the planes of the focus of said lens system.

22. In a motion picture apparatus, the combination as substantially set forth of a single fixed lens system, a continuously moving recording medium and a plurality of reflecting mediums which are co-extensive with the potential picture spaces, the said reflecting mediums being disposed to reflect light between said lens system and said recording medium, and means to move said reflecting mediums with respect to the recording medium at the same linear speed to simultaneously maintain an optically stationary relationship between the lens system and consecutively successive portions of the recording medium at the point and during the interval of exposure.

23. In an optical device for making a negative photographic record upon a continuously moving photographic medium, the combination of a continuously open lens system, a continuously moving photographic medium and a plurality of reflecting mediums, and means to move said reflecting mediums at the same linear speed as that of said photographic medium to constantly maintain an optically stationary relationship between the said photographic medium and the optical center of the lens system, at the point and during the interval of exposure.

24. In an apparatus for projecting a continuous pictorial reproduction of an object in motion, the combination of a single fixed lens system, a constantly moving projecting medium, and a plurality of reflecting mediums, means to move said reflecting mediums at the same linear speed as said projecting medium to constantly present to the lens system a single complete and animated picture of the said object in motion, and to constantly maintain a fixed and common optical relationship between correlated points upon consecutively successive portions of the projective mediums and the optical center of the lens system.

25. In a motion picture apparatus, a single fixed lens system, a photographic film, means to constantly move said film in a path angularly disposed with relation to the axis of the lens system, a set of reflecting mediums acting two at a time, disposed between the lens system and the film, and means to move said mediums at the same linear speed as that of said film and in a path disposed at the same angle to the axis of said lens system as that of the travel of said film to maintain a correct optical relationship at all times between a given point upon the film and the corresponding point in the visual field of the lens system.

26. In a motion picture apparatus, a fixed lens system, a reflector passing through the principal axis of said lens system at an angle of 45° and arranged to reflect the light passing through said lens at an angle of 90° to the principal axis, a film arranged to pass through the axis of light as reflected from said reflector and to move at an angle of 45° to the principal axis of said lens in the plane of the principal axis of said lens and normal to the plane in which is the line of travel of said reflector and the principal axis of said lens.

27. In a motion picture apparatus, a fixed lens system, a series of reflectors, means to continuously cause said reflectors to move in a line passing through the principal axis of said lens at an angle of 45° thereto and in a relatively horizontal plane, a film carrier, means to feed said film carrier continuously in a direction disposed at an angle of 45° to the principal axis of said lens and in a vertical plane.

28. In a motion picture apparatus, a fixed lens system, a series of reflectors, means to continuously cause said reflectors to move in a line passing through the principal axis of said lens at an angle of 45° thereto and in a relatively horizontal plane, each reflector being disposed to reflect the light from said lens at an angle of 90° to the principal axis of said lens and vertically, a film carrier, means to feed said film carrier continuously in a direction disposed at an angle of 45° to the principal axis of said lens and in a vertical plane.

29. In a motion picture apparatus, a fixed lens system, a series of reflectors, means to continuously cause said reflectors to move in a line passing through the principal axis of said lens at an angle of 45° thereto and in a relatively horizontal plane, each reflector being disposed to reflect the light from said lens at an angle of 90° to the principal axis of said lens and vertically, a film carrier, means to feed said film carrier continuously in a direction disposed at an angle of 45° to the principal axis of said lens and in a vertical plane, the rate of travel of said reflectors and film carrier being the same.

30. The combination of a fixed lens system, a series of reflectors, means to move said reflectors continuously in a path to and through the principal axis of said lens system, the line of travel being at an angle of 45° to the principal axis of said lens system, each reflector as it passes through the field of illumination of said lens being arranged to intercept and reflect the light at right angles to the plane coincident with the principal axis of said lens and the line of motion of said reflectors.

31. The combination of a fixed lens system, a series of reflectors, means to move said reflectors continuously transverse to and through the principal axis of said lens system, the line of travel being at an angle of 45° to the principal axis of said lens system, each reflector as it passes through the field of illumination of said lens being arranged to intercept and reflect the light at right angles to the plane coincident with the principal axis of said lens and the line of motion of said reflectors, a film carrier, and means to hold a series of surfaces of the film supports on said carrier in planes parallel to the plane coincident with the principal axis of said lens and the line of travel of said reflectors.

32. The combination of a fixed lens system, a series of reflectors, means to move said reflectors continuously transverse to and through the principal axis of said lens system, the line of travel being at an angle of 45° to the principal axis of said lens system, each reflector as it passes through the field of illumination of said lens being arranged to intercept and reflect the light at right angles to the plane coincident with the principal axis of said lens and the line of motion of said reflectors, a film carrier, and means to hold a series of surfaces of the film supports on said carrier in planes parallel to the plane coincident with the principal axis of said lens and the line of travel of said reflectors, the travel of said reflectors and said film carrier being synchronous.

33. In a motion picture apparatus, the combination with a fixed lens system, of a transparent carrier for a photographic record, means to continually move said carrier with its center in a plane coincident with the principal axis of the lens system, and at an angle of 45° to the principal axis of said lens system, and to maintain the operative surface of said carrier normal to said first mentioned plane and parallel to the principal axis of said lens system, a reflector, means to move said reflector with its center in a plane normal to said first mentioned plane and coincident with the principal axis of said lens system and at an angle of 45° to the principal axis of the said lens system, said reflector being operative to maintain the virtual image of said lens system in the plane surface of said carrier and relatively stationary with respect thereto.

34. In a moving picture apparatus, the combination of a photographic record, means to continuously project light through consecutive portions of said record, means to continuously move said record through said light in consecutive parallel planes, a fixed lens system, a series of reflectors, means to move said reflectors synchronously with said record to reflect the light passing through said record to and out of said lens system and to maintain a fixed and correct optical relationship between said record and the optical center of said lens system.

35. In an optical apparatus, a fixed lens system, a photographic medium, a reflector, and means to move said photographic medium and said reflector synchronously at the same linear speed, said reflector being moved in a path transverse to the fixed axis of said lens system at an angle of 45° thereto and arranged to reflect the light between said lens system and said medium at an angle of 90° to the principal axis of said lens system and normal to the surface of said medium during the passage of said reflector through the field of illumination of said lens system and said medium being simultaneously moved to maintain a fixed focal distance between said medium and the optical center of said lens.

36. In a continuous motion picture machine, the combination of an objective, a record carrying a series of impressions or pictures, means to move said record continuously through the field of said objective, reflecting means to transmit said pictures to said objective and thence to a fixed focused position, and means to carry said reflecting means with and across said record in a diagonal line.

37. In a continuous motion picture machine, the combination of an objective, a record carrying a series of impressions or pictures, means to move said record continuously through the field of said objective, reflecting means to transmit said pictures to said objective and through said objective to a fixed focused position, means to move said reflecting means with and across said record in a diagonal line divergent to a line intersecting diagonally opposite corners of the projected images.

38. In a continuous motion picture machine, the combination of an objective, a film carrying a series of impressions or pictures, means to continuously move said film through the field of said objective, means to reflect said pictures along a fixed pathway to said objective and thence to a fixed focused position, comprising a plurality of reflectors, and means to carry said reflectors with, across and away from said film in a diagonal line.

39. In a continuous motion picture machine, the combination of an objective, a film carrying a series of impressions or pictures, means to move said film longitudinally continuously through the field of said objective, and means to reflect said pictures along a fixed pathway to and through said objective to a fixed focused position, said means comprising a plurality of reflectors, and means to move said reflectors with and across said film in a diagonal line divergent to a line intersecting the diagonally opposite corners of the projected images.

40. In a continuous motion picture machine, the combination of an objective, a film carrying a series of impressions or pictures, a series of reflectors, means to move said reflectors with and across the film in a diagonal line divergent to a line intersecting the diagonally opposite corners of the projected pictures and divergent from their direction of travel.

41. In a continuous motion picture machine, the combination of an objective, a record carrying a series of impressions or pictures, a series of reflecting devices, means to move said series of reflecting devices with and across said record in a diagonal line intersecting the axis of said objective, means to feed said film longitudinally through the field of illumination of said lens as reflected by said reflecting devices passing through said field and to synchronize the longitudinal movement of said reflectors and of said film to maintain a fixed focal distance between the optical center of said objective along a line extending from said objective to a reflector of said series and thence to an impression on said film in registration therewith.

42. In a continuous motion picture machine, the combination of an objective, a record carrying a series of impressions or pictures, a series of reflectors, means to cause said reflectors to travel with and across said record in a diagonal line divergent to a line intersecting diagonally opposite corners of the projected pictures and divergent from their direction of travel and passing through the axis of said objective, means to move said film continuously through the field of illumination of said objective as reflected by said reflectors and to maintain a constant optical distance between the center of said objective and a picture while in said reflected field.

43. The method of taking continuous pictures which consists in moving a series of sensitized surfaces arranged in parallel planes through a reflected field of illumination of a continuously open fixed lens system and maintaining the image of said lens system in focus in the planes of the exposed portions of said sensitized surfaces and the field of illumination stationary with respect to said sensitized surfaces during the passage of said sensitized surfaces through said field of illumination of said lens system.

44. The method of taking continuous pictures which consists in moving a series of photographically sensitized surfaces and continuously moving a series of reflectors continuously through the field of a continuously open lens system and in paths arranged at angles to each other and to the principal axis of said lens system, the path of said reflectors being through the principal axis of said lens system and the path of said photographic surfaces being such as to maintain the image in focus on the exposed portion of said sensitized surface and the field stationary with respect to said sensitized surface during the passage of said sensitized surface through the reflected field of illumination of said lens.

45. The method of taking continuous pictures which consists in continuously moving a series of photographically sensitized surfaces arranged in parallel planes, and synchronously moving a series of reflectors continuously through the principal axis of the lens to reflect the light from said lens to said photographic surfaces consecutively and successively and to maintain the exposed portions of said film at fixed focal distances from the optical center of said lens during the passage of said sensitized surfaces through the field of illumination of said lens system as reflected by said reflectors.

In witness whereof, I have hereunto set my hand this 13th day of November, 1914.

EDMOND H. LYSLE.

Witnesses:
 WILHO A. KOSKEN,
 LULU RAESCHER.